June 24, 1924.

N. A. PALMGREN

SELF ADJUSTING ROLLER BEARING

Filed March 9, 1920   2 Sheets-Sheet 1

1,498,571

INVENTOR.
N. A. Palmgren
By Rogers, Kennedy & Campbell
ATT'YS.

June 24, 1924.  
N. A. PALMGREN  
1,498,571  
SELF ADJUSTING ROLLER BEARING  
Filed March 9, 1920
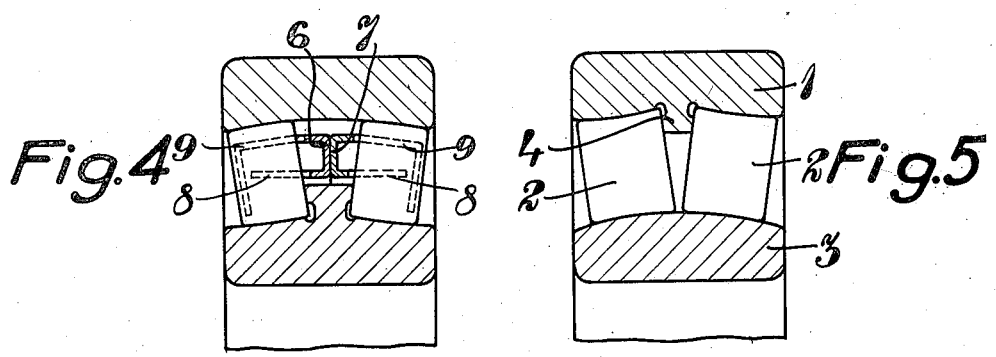
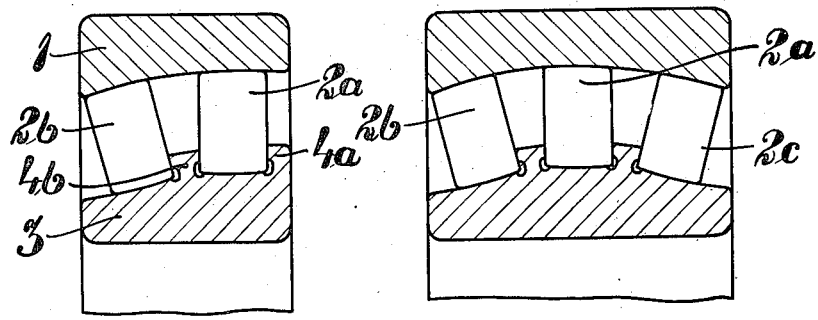
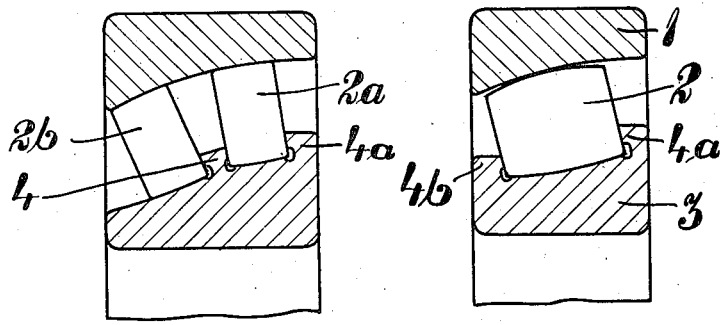
INVENTOR.  
N. A. Palmgren  
By Rogers, Kennedy & Campbell  
ATTYS.

Patented June 24, 1924.

1,498,571

UNITED STATES PATENT OFFICE.

NILS ARVID PALMGREN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

SELF-ADJUSTING ROLLER BEARING.

Application filed March 9, 1920. Serial No. 364,385.

*To all whom it may concern:*

Be it known that I, NILS ARVID PALMGREN, a subject of the King of Sweden, residing at Gottenborg, Sweden, in the Kingdom of Sweden, have invented certain new and useful Improvements in Self-Adjusting Roller Bearings, of which the following is a specification, reference being had therein to the accompanying drawing.

This invention relates to self-adjusting roller bearings having a spherical race on one of the track rings and being so arranged that on account of a special arrangement of the race or races of the other track-ring and a special form of the rollers the latter will obtain a good steering in the bearing and an oblique running and jamming of the rollers will be prevented.

The invention consists, chiefly, in such an arrangement of the non-spherical race and the rollers in relation to the spherical race that the resultant of the pressure from the outer race and the resultant of the pressure from the inner race against a roller form an angle with each other and on account thereof give a resulting force acting in the direction of the axis of the roller by which the latter is pressed against a guiding flange arranged at one side of the non-spherical race.

Figure 1:
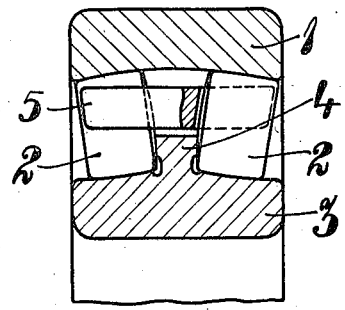
Figure 2:
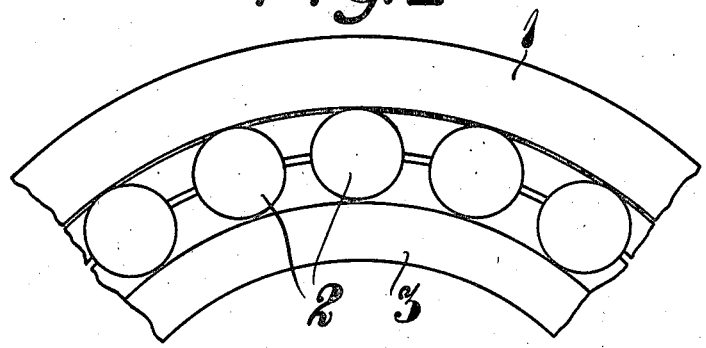
Figure 3:
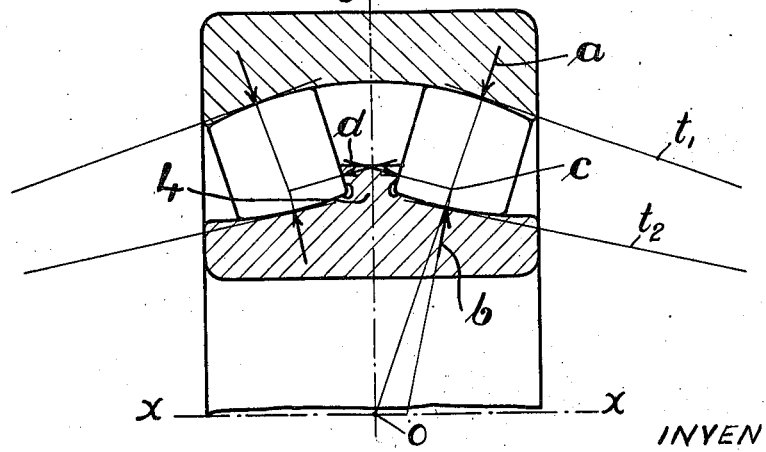

In the accompanying drawings I have shown some embodiments of my invention. Fig. 1 is a partial axial section of a two-set roller bearing constructed according to this invention. Fig. 2 is a partial side-view of the same. Fig. 3 shows on a larger scale a partial axial section of a bearing analogous to the bearing shown in Figs. 1 and 2. Figs. 4, 5 and 6 show partial axial sections of other modifications of roller bearings constructed according to this invention. Fig. 7 shows a partial axial section of a three-set roller bearing. Figs. 8 and 9 are partial axial sections of roller bearings adapted for taking up axial thrusts, Fig. 8 showing a two set roller bearing and Fig. 9 a one set roller bearing.

Referring to Figs. 1 and 2 of the drawings, the bearing shown in said figures has an integral outer bearing ring 1 provided with a spherical race. The shape of the rollers 2 is such that they coincide with the spherical race and the shape of the races of the inner integral ring 3 is such that they likewise coincide with the rollers, i. e., the curvature of the cross sections of all races as well as the longitudinal section of the rollers have equal radii, the result being that the rollers and races of both rings have line contact. Such line contact at both rings is, however, not necessary for the object aimed at by the present invention, inasmuch as it will be sufficient if there is line contact between one race and the rollers and point contact at the other race. For obtaining point contact at the spherical race and line contact at the non-spherical races the generatrix of the rollers is formed as an arc the radius of which is less than the radius of the spherical race and the cross-section of the non-spherical races as arcs having a radius equal to the generatrix of a roller. If desired, the bearing may be so constructed that it has point contact at both race rings, the radius of the spherical race as well as of the cross-sections of the non-spherical races being in such case greater than the radius of the generatrix of a roller. In each case the rollers are so formed in relation to the roller races that the resultant of the pressure at the outer race and the resultant of the pressure at the inner race form an angle with each other thus giving a resulting force acting on the roller in its longitudinal direction. For taking up said resulting force a guiding flange 4 is arranged at the side of the non-spherical race (see Figs. 1 and 3) which flange may be integral with the race ring or may be rigidly connected therewith in any suitable manner. The guiding flange 4 may suitably be common for both rows of rollers but it is possible to arrange a separate flange for each row of rollers if the distance between the rows of rollers is sufficiently large.

Fig. 3 illustrates the forces acting on the rollers in a bearing of the type shown in Fig. 1. The resultant of pressure *a* at the outer spherical race is directed against the centre *o* of said race. The resultant of pressure *b* at the inner race forms a greater angle with the geometrical axis *x—x* of the bearing than the resultant *a—o* and forms accordingly an angle with the latter intersecting it in a point *c*. The forces *a* and *b* give, accordingly, a resultant which acts on the roller in the direction *c—d* and tends to move the roller toward the median plane *o—y* of the bearing. Said resultant is compensated by a reaction *d* from the guiding flange 4 which holds the roller in balance in the bearing. During the work of the bearing the rollers are, accordingly, pressed against the said flange 4 with a suitable pressure, the rollers obtaining by such action a good steering at the inner end surface and are thus prevented from turning to an oblique position in the bearing. The rollers maintain, accordingly, always correct positions and roll evenly and without jamming, which advantage more than compensates the additional sliding friction which is caused by the guiding flange and the convex form of the rollers.

In Fig. 3 I have shown the principal tangents $t_1$ $t_2$ of the rollers in the points in which the resultants of pressure at the race rings are acting. Said tangents shall for the sake of minimizing the friction intersect each other in a point on or near to the axis $x-x$ of the bearing.

As is shown in Fig. 3 the rollers according to the present invention have in bearings with spherical outer race a convex form and are so shaped that their greatest diameter lies nearer to the one (the inner) end surface than to the other one, the resultants of pressure $a$ and $b$ acting in points which are positioned at the side of said greatest diameter. If desired, the greatest diameter may coincide with one (the inner) end surface of the roller.

The form of the guiding flange may be varied without departing from the principle of the invention.

In Fig. 1, I have shown the side surfaces of the flange as being concave and spherical, the inner ends of the rollers having a corresponding spherical form. Instead of said form the side surfaces of the guiding flange may have a conical form, the end surface of the roller being in such case either plane or conical.

In Fig. 1 I have shown a roller cage 5 consisting of a solid ring having sidewardly extending projections forming pockets for taking up the rollers. The bearing shown in Fig. 4 differs from that shown in Fig. 1 only by the construction of the roller cage, the latter consisting of two sheet metal rings 6, 7 bearing against each other or being rigidly connected with each other, said rings having folded projections or tongues 8, 9 projecting into the spaces between the rollers and holding the latter apart from each other. The projections or tongues 8 are suitably positioned about midway between the inner and outer races, while the projections 9 form supports for the rollers near to the spherical race and at the outer ends of the rollers.

Fig. 5 shows a modification having spherical inner race ring 3, the rollers 2 having concave mantle surface the generatrix of which is suited to the spherical race. The outer race ring 1 has two convex races the cross-section of which has a radius equal to that of the generatrix of the rollers so that said races likewise are suited to the rollers. The guiding flange 4 is disposed on the outer race ring between its races. The arrangement and form of races and rollers in this modification as well as in the following ones are, principally, the same as in the bearing shown in Fig. 1 and 2, the rollers being accordingly always pressed against the guiding flange by a resulting thrust. As in the bearing shown in Fig. 1 it is possible to use point contact at one race in the bearing according to Fig. 5. For obtaining point contact at the spherical race and line contact at the non-spherical race the generatrix of the rollers is formed as an arc having a greater radius than the spherical race and the cross-sections of the outer races as arcs the radius of which is equal to the radius of the generatrix of the roller. For obtaining line contact at the spherical race and point contact at the non-spherical races the generatrix of the rollers is formed as an arc the radius of which is equal to the radius of the spherical race and the cross-sections of the non-spherical races as arcs having a smaller radius than the generatrix of the rollers.

As is shown in Fig. 5, the rollers for bearings having inner spherical race have a concave mantle surface, and said mantle surface is so shaped that its smallest diameter is positioned near to one (the outer) end surface than to the other one. If desired, the smallest diameter of the roller may coincide with one (the outer) end surface.

The bearings shown in Fig. 1-5 are chiefly intended to be used for taking up radial loads and under circumstances a small axial thrust in either direction. For that purpose both rows of rollers are arranged symmetrically in relation to the middle plan of the bearing forming right angles with the axis of the bearing and both rows of rollers are disposed rather near to said plan, the direction of the pressures acting upon a roller forming nearly right angles with the axis of the bearing. When the bearing shall sustain a radial load and axial thrust acting in one direction only the bearing may suitably be made asymmetric as is shown in Fig. 6. As in Fig. 1 the outer race ring 1 has a spherical race and the inner race ring 3 two concave races. One set of rollers $2^a$ is arranged in the transverse plan which contains the centre of the spherical race and is guided by two guiding flanges $4^a$ and $4^b$ at both sides of the set of rollers while the set of rollers $2^b$ is guided by the flange $4^b$. In as much as the resultants of pressure at the inner and outer races form an angle with each other in the same manner as in Fig. 3 the rollers $2^b$ are, accordingly, pressed against said flange. The bearing according to Fig. 7 differs from the bearing shown in Fig. 6 by having three rows of rollers 2ª, 2ᵇ, and 2ᶜ of which the rows 2ᵇ and 2ᶜ are adapted to take up axial thrusts respectively in opposite directions.

In all forms described above the bearing is self-contained in as much as it is provided with one set of rollers on each side of a plan forming right angles with the axis of the bearing and containing the centre of the spherical race. The bearings according to this invention may, however, be carried out also in such manner that they are not self-contained by providing the bearing with one or more sets of rollers which are disposed at the same side of said centre plane without the use of any set of rollers on the other side of such plan. Fig. 8 shows an example of such a two set roller bearing. The rollers 2ª are in this modification guided between the guiding flanges 4ª and 4ᵇ while the rollers 2ᵇ are guided by the flange 4ᵇ. The directions of pressure at the set of rollers 2ª and 2ᵇ are in this case suitably so chosen that the rollers 2ª permanently are pressed against the guiding flange 4ª and the rollers 2ᵇ are permanently pressed against the guiding flange 4ᵇ. Fig. 9 shows a bearing not self-contained having one set of rollers 2 only disposed between a spherical race on the outer race ring 1 and a race having a concave cross-section on the inner race ring 3. Guiding flanges 4ª and 4ᵇ are arranged at both sides of the set of rollers at the inner race ring and the races and the mantle surfaces of the rollers are so shaped that the rollers are permanently pressed against the guiding flange 4ª, the flange 4ᵇ being only an auxiliary flange which may be omitted. The bearings according to Figs. 8 and 9 are adapted to take up radial load and axial thrust in one direction and are therefore adapted for use in such cases where it is desired to take out the journalled shaft by an axial displacement of the shaft together with inner bearing ring attached thereto.

It is to be understood that the invention is not limited to the above described constructional forms thereof, as it can be modified in several manners without departing from the essential features of the invention.

I claim:

1. A self-adjusting roller bearing comprising inner and outer race rings, one of which is formed with a spherically curved race and the other with a cooperating race and a roller guiding flange, and rollers tracking on said races and formed with bearing surfaces curved axially, the curves of the races being such in relation to the axial curvatures of the rollers that the resultants of the pressures on the rollers at the outer and inner races will form an angle with each other and give a resulting force acting substantially in the direction of the axis of the rollers and toward the guiding flange; whereby the rollers will be pressed against the flange and guided thereby.

2. A self-adjusting roller bearing comprising inner and outer race rings, one of which is formed with a spherically curved race and the other with two races and with a roller guiding flange between, and two series of rollers tracking on said races respectively, and formed with bearing surfaces curved axially, the curvatures of the races being such in relation to the axial curvatures of the rollers that the resultants of the pressures on the rollers at the outer and inner races will form angles with each other and give resulting forces acting substantially in the direction of the axes of the rollers and towards the guiding flange; whereby the two series of rollers will be pressed against the guiding flange and be guided thereby.

3. A self-adjusting roller bearing according to claim 1, characterized by the fact that the principal tangents of the rollers at the points where the resultants of pressure act on the rollers will converge.

4. A self-adjusting roller bearing according to claim 1, characterized by the fact that the principal tangents of the rollers at the points where the resultants of pressure act on the rollers will intersect each other at a point approximately on the axis of the bearing.

5. A self-adjusting roller bearing according to claim 2, characterized by the fact that the principal tangents of the rollers at the points where the resultants of pressure act on the two series of rollers will intersect at points on opposite sides of the bearing approximately on the axis thereof.

6. A self-adjusting roller bearing according to claim 1, characterized by the fact that the greatest diameters of the rollers lie nearer to one end of the rollers than the other end.

7. A self-adjusting roller bearing according to claim 1, characterized by the fact that the greatest diameters of the rollers lie next the guiding flange.

8. A self-adjusting roller bearing according to claim 2, characterized by the fact that the greatest diameters of the rollers lie next the inner ends of the same.

9. A self-adjusting roller bearing according to claim 1, characterized by the fact that the roller guiding flange is on the inner race ring.

10. A self-adjusting roller bearing according to claim 2, characterized by the fact that the roller guiding flange is on the inner race ring between the two series of rollers.

11. A self-adjusting roller bearing according to claim 2, characterized by the fact that the rollers have line contact on the inner and outer races.

12. A self-adjusting roller bearing according to claim 1, characterized by the fact that the guiding surface of the guiding flange is flat.

13. In an anti-friction bearing the combination of inner and outer race rings provided with races, two series of rolling elements traveling on said races, and a cage for the rolling elements, said cage comprising an annular body portion extending between the two series of rolling elements, projections on said body extending between the rolling elements to separate them from each other, and additional projections on the body extending between the rolling elements to retain them on one of the race rings.

14. In a roller bearing the combination of inner and outer race rings provided with races, two series of rollers traveling on said races, and a cage for the rollers, said cage comprising an annular body portion extending between the two series of rollers, tongues projecting from said body portion and extending between the rollers to separate them from each other, and additional tongues projecting from the body portion and extending between the rollers at points outward of the other tongues, to retain the rollers on the inner race ring.

15. A self-adjusting roller bearing, comprising an outer race ring having a spherical race, an inner race ring having a non-spherical race, and rollers having convex mantle surfaces of such shape that their greatest diameter lies nearer to one end surface than to the other one.

16. A self-adjusting roller bearing according to claim 1, characterized by the fact that the greatest diameters of the rollers lie nearer to one end of the rollers than the other end, and the resultants of pressure act upon the rollers in points which are positioned at the side of the said greatest diameter.

17. A roller bearing comprising inner and outer race rings having curved races, one of which rings is provided with a roller guiding flange, and rollers tracking on said races and formed with bearing surfaces curved axially, the curves of the races being such in relation to the axial curvatures of the rollers, that the resultants of the pressures on the rollers at the outer and inner races will form an angle with each other and give a resulting force acting substantially in the direction of the axis of the rollers and operating to force the ends of the rollers against the guiding flange, the contacting surfaces of the roller ends and guiding flange being of such relative form as to prevent the rollers from turning to an oblique position in the bearing.

18. A roller bearing comprising inner and outer race rings having curved races, one of which rings is formed with a roller guiding flange, and rollers having axially convexed surfaces and whose greatest diameter lies nearer to one end of the roller than the other end, the said rollers tracking on said races with their larger ends in engagement with the guiding flange, and the contacting surfaces of the roller ends and guiding flange being of such relative form as to prevent the rollers from taking an oblique position in the bearing.

19. A roller bearing comprising inner and outer race rings each formed with a curved race surface, one confronting the other, and rollers tracking on said race surfaces and formed with bearing surfaces curved axially, the curves of the race surfaces being such in relation to the axial curvatures of the rollers, that the resultants of pressure on the rollers at the outer and inner race surfaces will form an angle with each other and will give a resultant force acting substantially in the direction of the axis of the rollers, and a roller guiding flange on one of the race rings in position to receive the thrust of the rollers due to said resultant force.

20. A roller bearing comprising inner and outer race rings, one of which is formed with two race surfaces with a roller guiding flange between the two surfaces, and the other of which is formed with roller tracking race surfaces, and two series of rollers tracking on said race surfaces and formed with bearing surfaces curved axially, the form of the race surfaces being such in relation to the curvatures of the rollers, that the resultants of the pressures on the rollers at the outer and inner race surfaces will form angles with each other and give resulting forces acting substantially in the direction of the axis of the rollers and operating to force the ends of the rollers against the guiding flange, the contacting surfaces of the roller ends and guiding flange being of such relative form as to prevent the rollers from turning to oblique positions in the bearing.

In testimony whereof I have signed my name.

NILS ARVID PALMGREN.